United States Patent
Xiao et al.

(10) Patent No.: US 12,431,782 B2
(45) Date of Patent: Sep. 30, 2025

(54) MODULAR MULTILEVEL CONVERTER AND CONTROL METHOD THEREOF

(71) Applicant: Delta Electronics (Shanghai) Co., Ltd., Shanghai (CN)

(72) Inventors: Peng Xiao, Shanghai (CN); Yi Zhang, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 204 days.

(21) Appl. No.: 18/381,592

(22) Filed: Oct. 18, 2023

(65) Prior Publication Data
US 2024/0154513 A1    May 9, 2024

(30) Foreign Application Priority Data
Nov. 8, 2022 (CN) .......................... 202211393764.2

(51) Int. Cl.
*H02M 7/217* (2006.01)
*H02M 1/00* (2006.01)
*H02M 1/32* (2007.01)

(52) U.S. Cl.
CPC .......... *H02M 1/0003* (2021.05); *H02M 1/32* (2013.01); *H02M 7/2173* (2013.01)

(58) Field of Classification Search
CPC .. H02M 7/2173; H02M 7/2176; H02M 7/219; H02M 7/2195; H02M 7/72; H02M 7/42; H02M 1/0003; H02M 1/0006; H02M 1/0009; H02M 1/0012; H02M 1/0032;

(Continued)

(56) References Cited

U.S. PATENT DOCUMENTS

| | | | |
|---|---|---|---|
| 10,389,268 B2* | 8/2019 | Onishi | H02J 3/36 |
| 2012/0112545 A1* | 5/2012 | Aiello | H02M 7/4837 |
| | | | 307/64 |
| 2016/0329832 A1* | 11/2016 | Aeloiza | H02M 1/12 |

FOREIGN PATENT DOCUMENTS

| | | |
|---|---|---|
| CN | 105914788 B | 5/2018 |
| CN | 109149623 A | 1/2019 |

OTHER PUBLICATIONS

Jinyu Wang et al., A Fault-Tolerant Operation Method for Medium Voltage Modular Multilevel Converters With Phase-Shifted Carrier Modulation, IEEE, Oct. 2019, pp. 9459-9470.

(Continued)

*Primary Examiner* — Nguyen Tran
(74) *Attorney, Agent, or Firm* — KIRTON McCONKIE; Evan R. Witt

(57) ABSTRACT

A modular multilevel converter and a control method are provided. When an AC input voltage from a power grid is lower than a drop threshold value and the modular multilevel converter is in a drop state, the idle upper bridge arm submodules of the n upper bridge arm submodules and the idle lower bridge arm submodules of the n lower bridge arm submodules are in the on-state. Consequently, the total number of the on-state upper bridge arm submodules and the on-state lower bridge arm submodules is increased to be greater than n. Since the average value of the DC voltages received by the upper bridge arm submodules or the lower bridge arm submodules is decreased, the voltage stress of the total submodule capacitor voltage of the on-state upper bridge arm submodules and the on-state lower bridge arm submodules is reduced.

10 Claims, 14 Drawing Sheets

(58) Field of Classification Search
CPC .............. H02M 1/0041; H02M 1/3236; H02M 1/4258; H02M 1/4266
See application file for complete search history.

(56) References Cited

OTHER PUBLICATIONS

Kai Li et al., Fault-Tolerant Control of MMC With Hot Reserved Submodules Based on Carrier Phase Shift Modulation, IEEE, Sep. 2017, pp. 6778-6791.

* cited by examiner

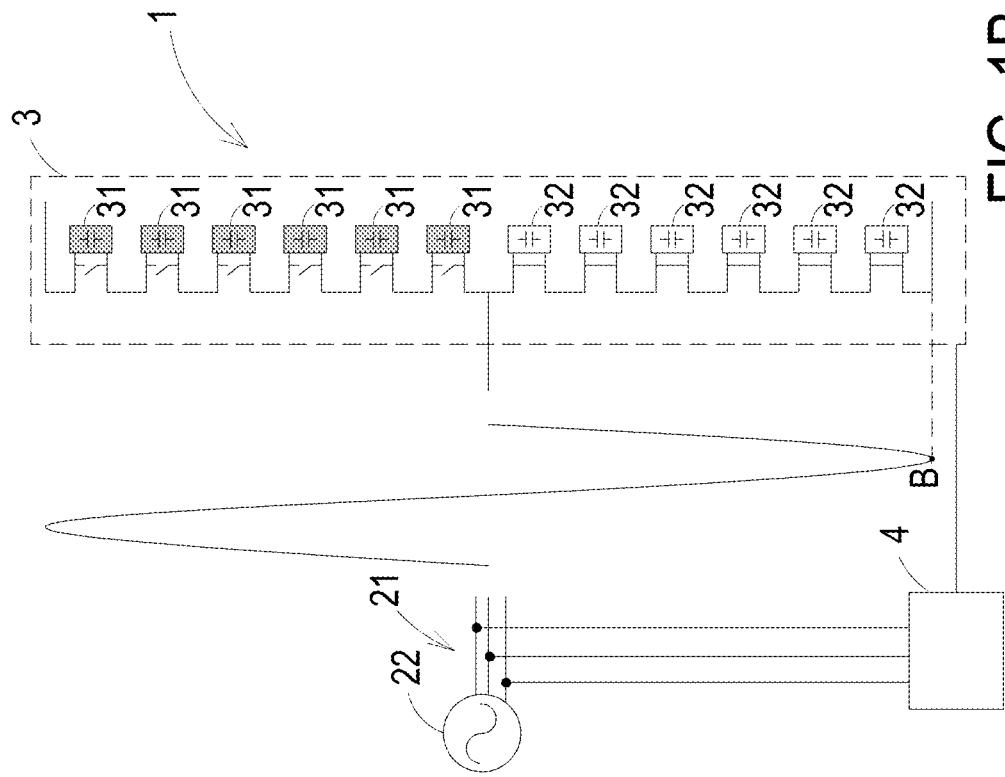
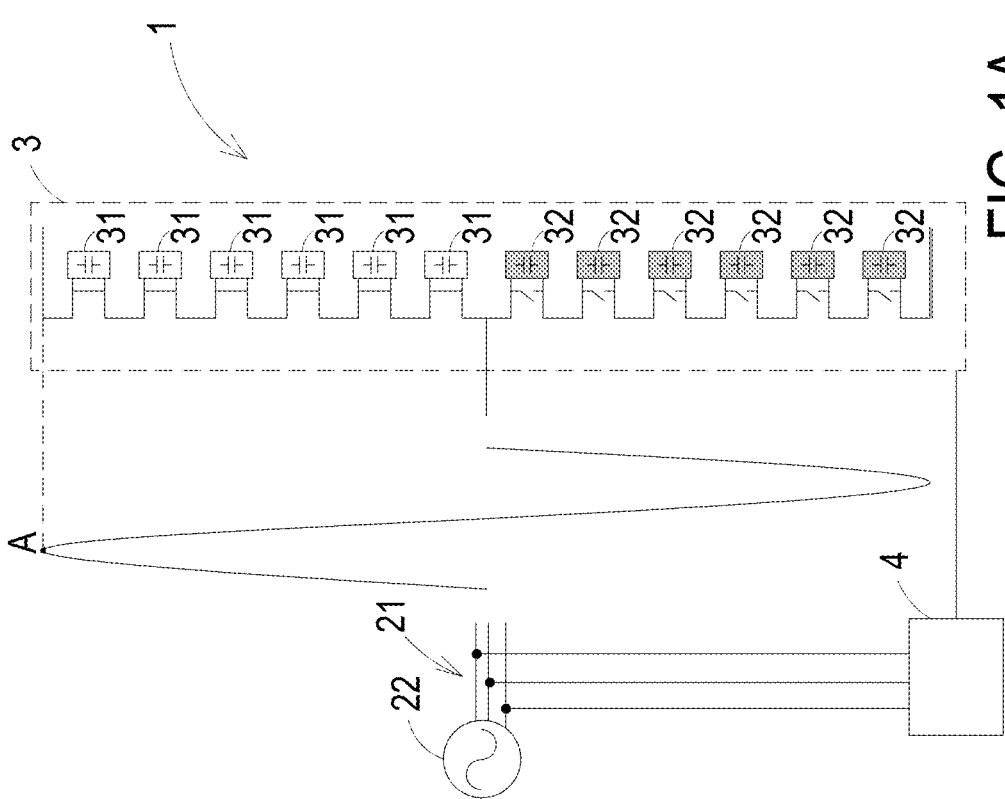

FIG. 8C

MODULAR MULTILEVEL CONVERTER AND CONTROL METHOD THEREOF

CROSS-REFERENCE TO RELATED APPLICATION

This application claims priority to China Patent Application No. 202211393764.2, filed on Nov. 8, 2022, the entire contents of which are incorporated herein by reference for all purposes.

FIELD OF THE INVENTION

The present disclosure relates to a power electronics technology, and more particularly to a modular multilevel converter and a control method for the modular multilevel converter.

BACKGROUND OF THE INVENTION

Generally, the module in a modular multilevel converter includes capacitors. In case that the AC input voltage received by the modular multilevel converter drops and needs to meet the low-voltage ride-through requirements, the voltage stress of the module in the modular multilevel converter may rise. In order to avoid the increase of the voltage stress, the number of capacitors or the capacitance of the capacitors in the modules of the conventional modular multilevel converter increases. Consequently, the cost of the conventional modular multilevel converter is increased. Moreover, the voltage stress may influence the reliability of the modular multilevel converter.

Moreover, in case that the AC input voltage received by the modular multilevel converter drops and needs to meet the low-voltage ride-through requirements, the fluctuation of the capacitors in the modules in the modular multilevel converter will be also increased. The conventional modular multilevel converter suppresses the voltage fluctuations by increasing the circulating current. However, this method will increase the current peak value and the voltage peak value of the bridge arm in the module. Consequently, the safety of the conventional modular multilevel converter is impaired.

For solving the drawbacks of the conventional technologies, it is important to provide a modular multilevel converter and a control method for the modular multilevel converter.

SUMMARY OF THE INVENTION

An object of the present disclosure provides a modular multilevel converter and a control method for the modular multilevel converter. In case that the modular multilevel converter is in a drop state, the idle upper bridge arm submodules of n upper bridge arm submodules and the idle lower bridge arm submodules of n lower bridge arm submodules are in the on-state. Consequently, the total number of the on-state upper bridge arm submodules and the on-state lower bridge arm submodules is increased to be greater than n. Since the average value of the DC voltages received by the upper bridge arm submodules or the lower bridge arm submodules is decreased, the voltage stress of the total submodule capacitor voltage of the on-state upper bridge arm submodules and the on-state lower bridge arm submodules is reduced. In accordance with the present disclosure, the modular multilevel converter and the control method can meet the low-voltage ride-through requirements in a cost-effective and high-reliable manner. Furthermore, the modular multilevel converter and the control method of the present disclosure can achieve the function of suppressing the voltage fluctuations. Consequently, the safety of using the modular multilevel converter and the control method of the present disclosure will be enhanced. Furthermore, the efficacy of suppressing the average voltage stress of the total submodule capacitor voltage is enhanced according to the initially added submodule number, the submodule adding rate, the initially cut submodule number or the submodule cutting rate.

In accordance with an aspect of the present disclosure, a control method for a modular multilevel converter is provided. The modular multilevel converter includes a bridge arm and a controller. The bridge arm includes n upper bridge arm submodules and n lower bridge arm submodules. The modular multilevel converter is electrically connected with a voltage bus. A midpoint of the voltage bus is electrically connected with a power grid. The modular multilevel converter receives an AC input voltage from the power grid. The AC input voltage has a positive peak value and a negative peak value relative to the midpoint of the voltage bus. The controller is coupled with the n upper bridge arm submodules and n lower bridge arm submodules. The control method includes the following steps. When the AC input voltage from the power grid is lower than a drop threshold value and the modular multilevel converter is in a drop state, the controller determines the number of working units in the n upper bridge arm submodules and the n lower bridge arm submodules based on the instantaneous value of the AC input voltage. Then, under control of the controller, y upper bridge arm submodules of the n upper bridge arm submodules and (n−y) lower bridge arm submodules of the n lower bridge arm submodules are in the on-state. Consequently, (n−y) of the n upper bridge arm submodules are idle upper bridge arm submodules and y of the n lower bridge arm submodules are idle lower bridge arm submodules. Under control of the controller, x idle upper bridge arm submodules of the (n−y) idle upper bridge arm submodules and x idle lower bridge arm submodules of the y idle lower bridge arm submodules are in the on-state in one or more times. When the instantaneous value of the AC input voltage is the positive peak value, at most m upper bridge arm submodules of the n upper bridge arm submodules are in the on-state, and at least (n−m) upper bridge arm submodules of the n upper bridge arm submodules are idle. When the instantaneous value of the AC input voltage is the negative peak value, at most m lower bridge arm submodules of the n lower bridge arm submodules are in the on-state, and at least (n−m) lower bridge arm submodules of the n lower bridge arm submodules are idle, wherein x≤(n−m).

In accordance with another aspect of the present disclosure, a modular multilevel converter is provided. The modular multilevel converter is electrically connected with a voltage bus. A midpoint of the voltage bus is electrically connected with a power grid. The modular multilevel converter receives an AC input voltage from the power grid. The modular multilevel converter includes a bridge arm and a controller. The bridge arm is connected with the voltage bus to receive the AC input voltage. The bridge arm includes n upper bridge arm submodules and n lower bridge arm submodules. The AC input voltage has a positive peak value and a negative peak value relative to the midpoint of the voltage bus. The controller is coupled with the n upper bridge arm submodules and n lower bridge arm submodules. The controller performs the control method of the present disclosure.

The above contents of the present disclosure will become more readily apparent to those ordinarily skilled in the art after reviewing the following detailed description and accompanying drawings, in which:

BRIEF DESCRIPTION OF THE DRAWINGS

FIGS. 1A and 1B are schematic circuit diagrams illustrating the operations of a modular multilevel converter according to an embodiment of the present disclosure, in which the positive peak value and the negative peak value of an AC input voltage from a power grid are in a normal working state;

FIGS. 8C and 8D schematically illustrate the simulation results of the control method for the modular multilevel converter according to the second embodiment of the present disclosure and the simulation results of the conventional modular multilevel converter, in which the AC input voltage from the power grid is in a single-phase drop state.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2A:
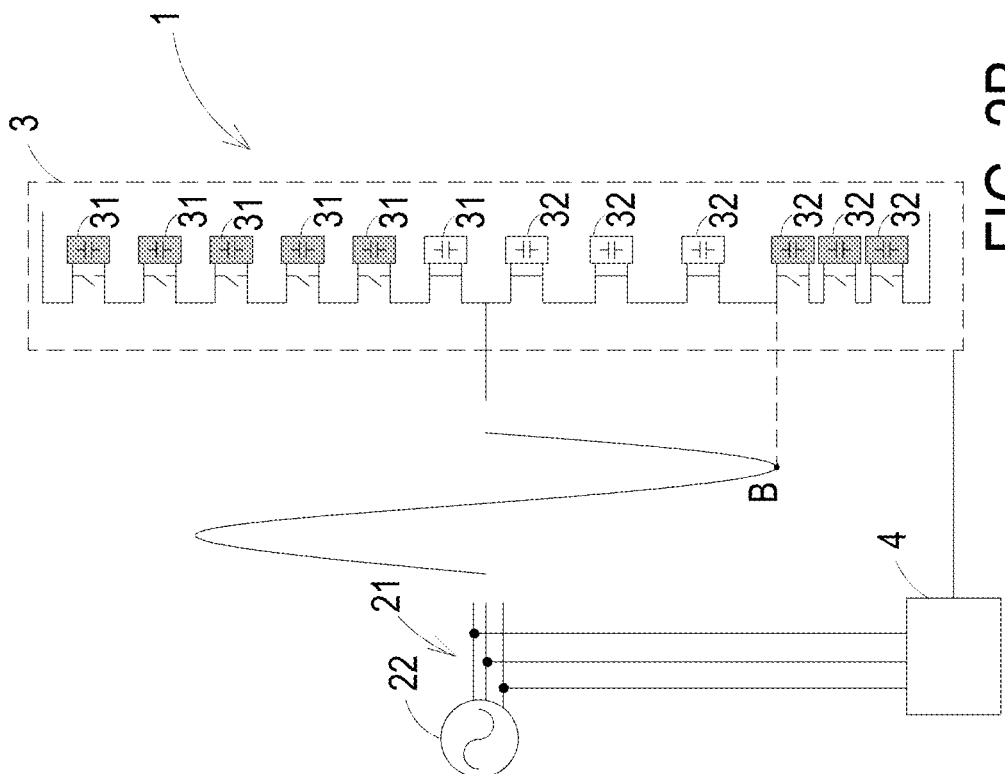
FIGS. 2A and 2B are schematic circuit diagrams illustrating the operations of the modular multilevel converter according to the embodiment of the present disclosure, in which the positive peak value and the negative peak value of the AC input voltage from the power grid are in a drop state.
Figure 2B:
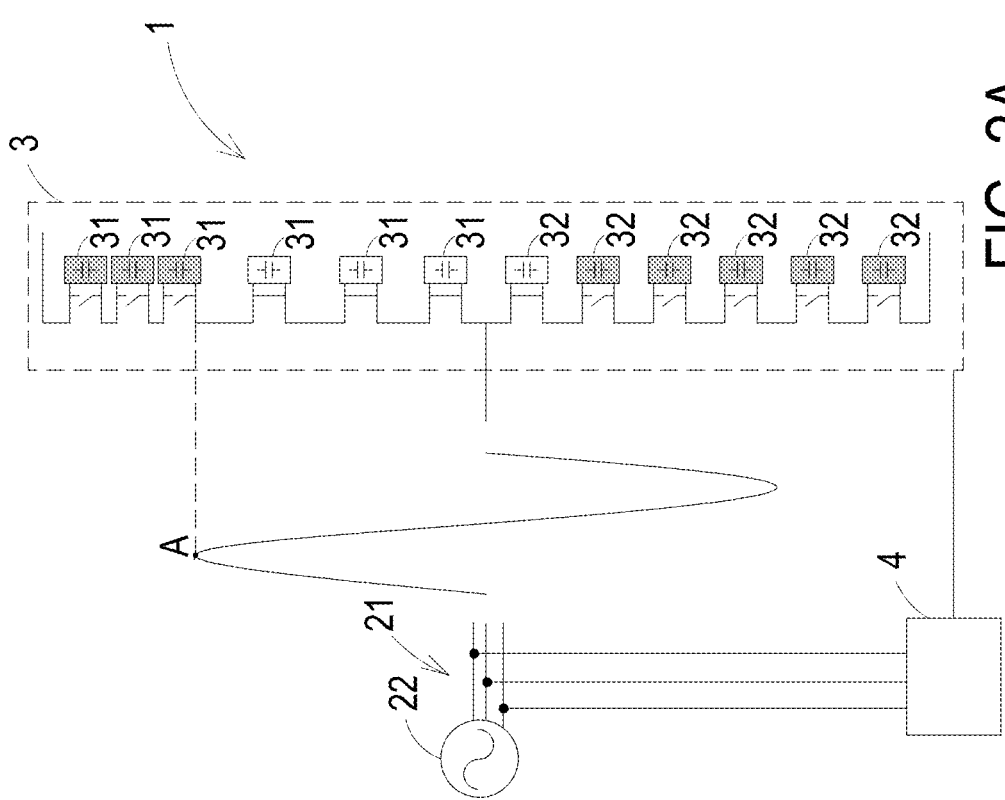

Please refer to FIGS. 1A, 1B, 2A and 2B. FIGS. 1A and 1B are schematic circuit diagrams illustrating the operations of a modular multilevel converter according to an embodiment of the present disclosure, in which the positive peak value and the negative peak value of an AC input voltage from a power grid are in a normal working state. FIGS. 2A and 2B are schematic circuit diagrams illustrating the operations of the modular multilevel converter according to the embodiment of the present disclosure, in which the positive peak value and the negative peak value of the AC input voltage from the power grid are in a drop state.

The modular multilevel converter 1 is electrically connected with a voltage bus 21 with three wires. These three wires of the voltage bus 21 are electrically connected to an external power grid 22 to receive three phase voltages R, S and T in the AC input voltage provided by the external power grid 22. The middle wire of the three wires of the voltage bus 21 is the midpoint of the voltage bus 21. The AC input voltage provided by the external power grid 22 has a positive peak value and a negative peak value relative to the corresponding phase of the voltage bus midpoint. The positive peak value represents the maximum positive voltage value between the corresponding phase of voltage bus midpoint and the AC input voltage. For example, the maximum point A shown in FIG. 1A denotes the positive peak value. The negative peak value represents the maximum negative voltage value between the corresponding phase and AC of voltage bus midpoint and the AC input voltage. For example, the minimum point B shown in FIG. 1B denotes the negative peak value. The modular multilevel converter 1 receives the AC input voltage from external power grid 22 through the voltage bus 21.

The modular multilevel converter 1 includes a bridge arm 3 and a controller 4. The bridge arm 3 is connected with the voltage bus 21 to receive the AC input voltage from external power grid 22. In this embodiment, the bridge arm 3 includes n upper bridge arm submodules 31 and n lower bridge arm submodules 32. For example, as shown in FIGS. 1A, 1B, 2A and 2B, the bridge arm 3 includes six upper bridge arm submodules 31 and six lower bridge arm submodule 32.

The controller 4 is electrically connected with the power grid 2, the n upper bridge arm submodules 31 and the n lower bridge arm submodules 32. According to the degree of modulation, for example the power relationship between the AC input voltage and the voltage of the voltage bus 21, the controller 4 determines the operating state of the modular multilevel converter 1. Moreover, the controller 4 controls the operations of the n upper bridge arm submodules 31 and the n lower bridge arm submodules 32 according to the operating state of the modular multilevel converter 1. In other words, the n upper bridge arm submodules 31 and the n lower bridge arm submodules 32 are selectively in an on-state or an off-state under control of the controller 4. In this context, the upper bridge arm submodule 31 in the off-state is referred as an idle upper bridge arm submodule, and the lower bridge arm submodule 32 in the off-state is referred as an idle lower bridge arm submodule. Each of the n upper bridge arm submodules 31 in the on-state can be switched to the idle upper bridge arm submodule by using a cutting method. Similarly, each of the n lower bridge arm submodules 32 can be switched to the idle lower bridge arm submodule by the cutting method. In the drawings, the bridge arm submodule with the gray background denotes the bridge arm submodule in the on-state, and the bridge arm submodule with the white background denotes the bridge arm submodule in the off-state.

In case that the AC input voltage from the power grid 22 does not drop or the AC input voltage from the power grid 22 is not lower than a drop threshold value, the controller 4 determines that the modular multilevel converter 1 is in the normal working state. For example, as shown in FIGS. 1A and 1B, the controller 4 determines that the modular multilevel converter 1 is in the normal working state. Based on the instantaneous value of the AC input voltage from the power grid 22, the controller 4 determines the number of working units in the upper bridge arm submodules 31 and the lower bridge arm submodules 32. That is, under control of the controller 4, u upper bridge arm submodules 31 of the n upper bridge arm submodules 31 and (n−u) lower bridge arm submodules 32 of the n lower bridge arm submodules 32 are in the on-state, wherein the value u is determined based on the instantaneous value of the AC input voltage.

As shown in FIG. 1A, the instantaneous value of the AC input voltage is the positive peak value. Under control of the controller 4, all of the n lower bridge arm submodules 32 are in the on-state, and all of the n upper bridge arm submodules 31 are in the off-state. In other words, the value u is 0. Under this circumstance, all of the lower bridge arm submodules 32 are not idle lower bridge arm submodules, but all of the upper bridge arm submodules 31 are idle upper bridge arm submodules.

As shown in FIG. 1B, the instantaneous value of the AC input voltage is the negative peak value. Under control of the controller 4, all of the n upper bridge arm submodules 31 are in the on-state, and all of the n lower bridge arm submodules 32 are in the off-state. In other words, the value u is n. Under this circumstance, all of the upper bridge arm submodules 31 are not idle upper bridge arm submodules, but all of the lower bridge arm submodules 32 are idle lower bridge arm submodule.

As mentioned above, the bridge arm 3 includes six upper bridge arm submodules 31 and six lower bridge arm submodule 32. In the situations of FIGS. 1A and 1B, the modular multilevel converter 1 is in the normal working state. In case that the instantaneous value of the AC input voltage is the positive peak value, all of the six lower bridge arm submodules 32 are in the on-state and all of the six upper bridge arm submodules 31 are in the off-state under control of the controller 4. In case that the instantaneous value of the AC input voltage is the negative peak value, all of the six upper bridge arm submodules 31 are in the on-state and all of the six lower bridge arm submodules 32 are in the off-state under control of the controller 4.

In case that the AC input voltage from the power grid 22 drops or the AC input voltage from the power grid 22 is lower than the drop threshold value, the controller 4 determines that the modular multilevel converter 1 is in the drop state. For example, as shown in FIGS. 2A and 2B, the controller 4 determines that the modular multilevel converter 1 is in the drop state. Similarly, based on the instantaneous value of the AC input voltage from the power grid 22, the controller 4 determines the number of working units in the upper bridge arm submodules 31 and the lower bridge arm submodules 32.

Firstly, under control of the controller 4, y upper bridge arm submodules 31 of the n upper bridge arm submodules 31 and (n−y) lower bridge arm submodules 32 of the n lower bridge arm submodules 32 are in the on-state, wherein the value y is determined based on the instantaneous value of the AC input voltage. In other words, (n−y) upper bridge arm submodules 31 of the n upper bridge arm submodules 31 are idle upper bridge arm submodules, and y lower bridge arm submodules 32 of the n lower bridge arm submodules 32 are idle lower bridge arm submodules.

Then, under control of the controller 4, x idle upper bridge arm submodules 31 of the (n−y) idle upper bridge arm submodules 31 and x idle lower bridge arm submodules 32 of the y idle lower bridge arm submodules 32 are in the on-state in one or more times.

As shown in FIG. 2A, the instantaneous value of the AC input voltage is the positive peak value. Under control of the controller 4, at most m upper bridge arm submodules 31 of the n upper bridge arm submodules 31 are in the on-state, and at least (n−m) upper bridge arm submodules 31 of the n upper bridge arm submodules 31 are idle, wherein x≤(n−m). As shown in FIG. 2B, the instantaneous value of the AC input voltage is the negative peak value. Under control of the controller 4, at most m lower bridge arm submodules 32 of the n lower bridge arm submodules 32 are in the on-state, and at least (n−m) lower bridge arm submodules 32 of the n lower bridge arm submodules 32 are idle, wherein x≤(n−m).

Take the situation of FIG. 2A for example. Firstly, under control of the controller 4, two upper bridge arm submodules 31 (i.e., y=2) of the six upper bridge arm submodules 31 and four lower bridge arm submodules 32 (i.e., n−y=4) of the six lower bridge arm submodules 32 are in the on-state. In other words, four upper bridge arm submodules 31 of the six upper bridge arm submodules 31 are idle upper bridge arm submodules, and two lower bridge arm submodules 32 of the six lower bridge arm submodules 32 are idle lower bridge arm submodules. Then, under control of the controller 4, one idle upper bridge arm submodule 31 (i.e., x=1) of the four idle upper bridge arm submodules 31 (i.e., n−y=4) and one idle lower bridge arm submodule 32 (i.e., x=1) of the two idle lower bridge arm submodules 32 (i.e., y=2) are in the on-state in one or more times. In other words, three upper bridge arm submodules 31 (i.e., x+y=3) of the six upper bridge arm submodules 31 and five lower bridge arm submodules 32 (i.e., n−y+x=5) of the six lower bridge arm submodules 32 are in the on-state. Consequently, the total number of the on-state upper bridge arm submodules 31 and the on-state lower bridge arm submodules 32 is greater than n (i.e., 3+5>6).

Figure 3:
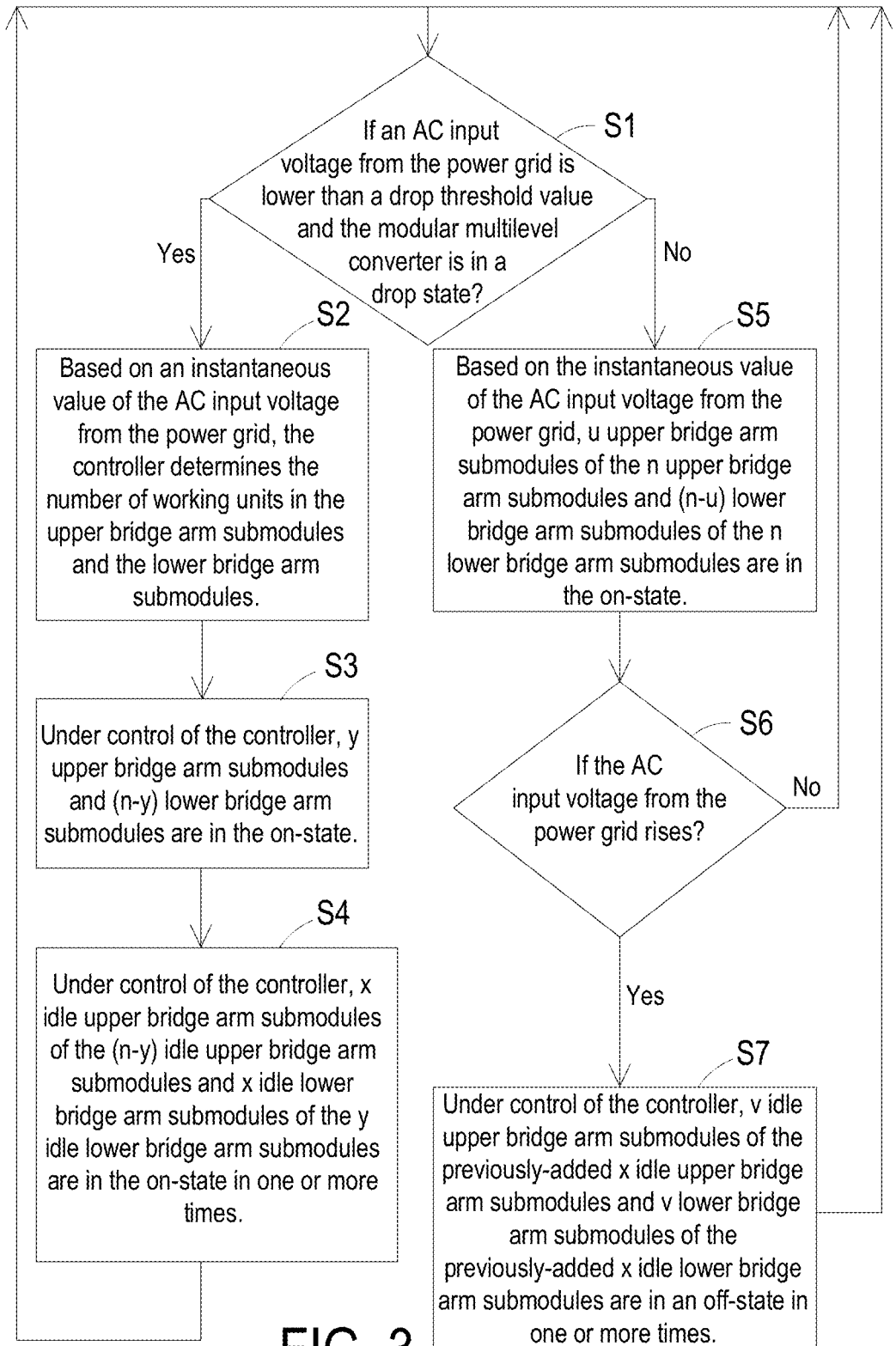
FIG. 3 illustrates a flowchart of a control method for the modular multilevel converter according to a first embodiment of the present disclosure.

Please refer to FIGS. 1A, 1B, 2A, 2B and 3. FIG. 3 is a flowchart illustrating a control method for the modular multilevel converter according to a first embodiment of the present disclosure.

Firstly, in a step S1, the controller 4 determines whether an AC input voltage from the power grid 22 is lower than a drop threshold value.

If the determining condition of the step S1 is satisfied, it means that the modular multilevel converter 1 is in a drop state. Then, based on the instantaneous value of the AC input voltage from the power grid 22, the controller 4 determines the number of working units in the upper bridge arm submodules 31 and the lower bridge arm submodules 32 (Step S2). Then, under control of the controller 4, y upper bridge arm submodules 31 of the n upper bridge arm submodules 31 and (n−y) lower bridge arm submodules 32 of the n lower bridge arm submodules 32 are in the on-state (Step S3).

Then, under control of the controller 4, x idle upper bridge arm submodules 31 of the (n−y) idle upper bridge arm submodules 31 and x idle lower bridge arm submodules 32 of the y idle lower bridge arm submodules 32 are in the on-state in one or more times (Step S4).

In case that the instantaneous value of the AC input voltage is the positive peak value, at most m upper bridge arm submodules 31 of the n upper bridge arm submodules 31 are in the on-state, and at least (n−m) upper bridge arm submodules 31 of the n upper bridge arm submodules 31 are idle, wherein x≤(n−m). In case that the instantaneous value of the AC input voltage is the negative peak value, at most m lower bridge arm submodules 32 of the n lower bridge arm submodules 32 are in the on-state, and at least (n−m) lower bridge arm submodules 32 of the n lower bridge arm submodules 32 are idle, wherein x≤(n−m).

After the step S4 is completed, the step S1 is repeatedly done.

If the determining condition of the step S1 is not satisfied, it means that the modular multilevel converter 1 is in a normal working state. Then, in a step S5, u upper bridge arm submodules 31 of the n upper bridge arm submodules 31 and (n−u) lower bridge arm submodules 32 of the n lower bridge arm submodules 32 are in the on-state based on the instantaneous value of the AC input voltage from the power grid 22, wherein the value u is determined according to the instantaneous value of the AC input voltage.

As mentioned above, in case that the modular multilevel converter 1 is in the drop state, the idle upper bridge arm submodules 31 and the idle lower bridge arm submodules 32 are in the on-state. Consequently, the total number of the on-state upper bridge arm submodules 31 and the on-state lower bridge arm submodules 32 is increased to be greater than n. Since the average value of the DC voltages received by the upper bridge arm submodules 31 or the lower bridge arm submodules 32 is decreased, the voltage stress of the total submodule capacitor voltage of the upper bridge arm submodules 31 and the lower bridge arm submodules 32 is reduced.

In the conventional modular multilevel converter, the number of capacitors or the capacitance of the capacitors in the modules is increased to decrease the voltage stress of the total submodule capacitor voltage. In accordance with the present disclosure, the modular multilevel converter 1 and the control method can meet the low-voltage ride-through requirements in a cost-effective and high-reliable manner. Furthermore, the modular multilevel converter 1 and the control method of the present disclosure can achieve the function of suppressing the voltage fluctuations. When compared with the conventional modular multilevel converter of increasing the circulating current to suppress the voltage fluctuations, the safety of using the modular multilevel converter 1 and the control method of the present disclosure will be enhanced.

It is noted that numerous modifications and alterations may be made while retaining the teachings of the disclosure. For example, in a variant example of the step S4, the x idle upper bridge arm submodules 31 of the (n−y) idle upper bridge arm submodules 31 and x idle lower bridge arm submodules 32 of the y idle lower bridge arm submodules 32 are in the on-state according to an initially added submodule number. For example, in the step S4, d idle upper bridge arm submodules 31 of the x idle upper bridge arm submodules 31 and d idle lower bridge arm submodules 32 of the x idle lower bridge arm submodules 32 are defined as the initially-added submodules, wherein d≤x. The value of the initially added submodule number (i.e., d) is determined according to the drop threshold value of the AC input voltage from the power grid 22.

Figure 4:
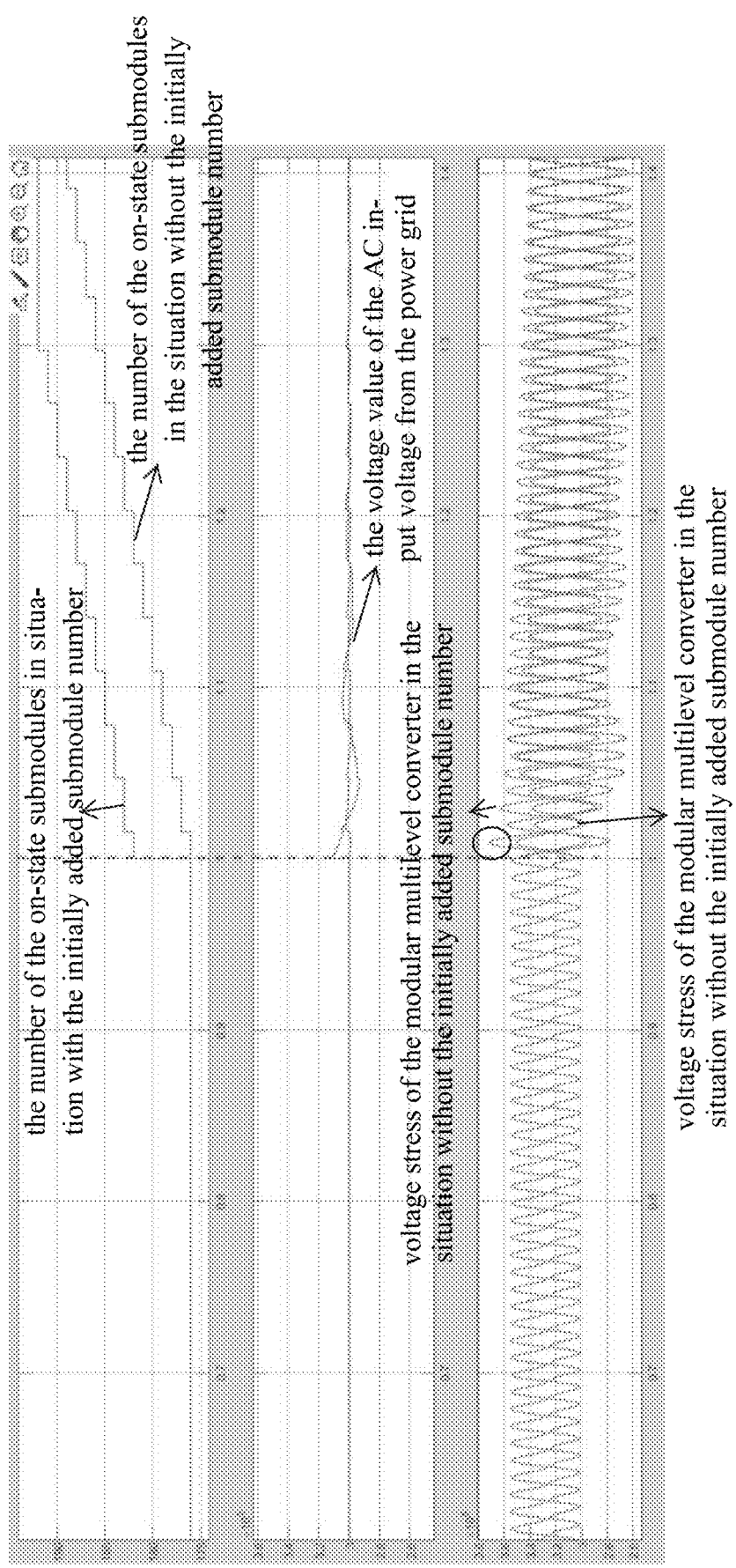
FIG. 4 schematically illustrates the simulation results of the control method for the modular multilevel converter according to the first embodiment of the present disclosure, in which the situation without the initially added submodule number and the situation with the initially added submodule number are compared.

FIG. 4 schematically illustrates the simulation results of the control method for the modular multilevel converter according to the first embodiment of the present disclosure, in which the situation without the initially added submodule number and the situation with the initially added submodule number are compared. It is assumed that the drop threshold value of the AC input voltage from the power grid 22 is 1V. In the upper plot of FIG. 4, the number of the on-state submodules in situation without the initially added submodule number and the number of the on-state submodules in the situation with the initially added submodule number are shown. In the middle plot of FIG. 4, the voltage value of the AC input voltage from the power grid 22 is shown. In the lower plot of FIG. 4, the voltage stress of the total submodule capacitor voltage of the modular multilevel converter 1 in the situation without the initially added submodule number and the voltage stress of the total submodule capacitor voltage of the modular multilevel converter 1 in the situation with the initially added submodule number are shown.

Please refer to the lower plot of FIG. 4 again. In case that the AC input voltage from the power grid 22 is lower than the drop threshold value, the voltage stress of the total submodule capacitor voltage of the modular multilevel converter 1 in the situation with the initially added submodule number is lower than the voltage stress of the total submodule capacitor voltage of the modular multilevel converter 1 in the situation without the initially added submodule number. In other words, the average voltage stress of the total submodule capacitor voltage of the modular multilevel converter 1 in the situation without the initially added submodule number exceeds the average voltage stress of the total submodule capacitor voltage of the modular multilevel converter 1 in the situation with the initially added submodule number. Due to the initially added submodule number, the voltage stress of the total submodule capacitor voltage of the modular multilevel converter 1 can be effectively suppressed.

In a variant example of the step S4, the x idle upper bridge arm submodules 31 of the (n−y) idle upper bridge arm submodules 31 and x idle lower bridge arm submodules 32 of the y idle lower bridge arm submodules 32 are in the on-state according to an initially added submodule number d, and the remaining (x−d) idle upper bridge arm submodules 31 of the x idle upper bridge arm submodules 31 and the remaining (x−d) idle lower bridge arm submodules 32 of the x idle lower bridge arm submodules 32 are in the on-state according to a submodule adding rate. The submodule adding rate denotes number of the added idle bridge arm submodules per stage.

Figure 5:
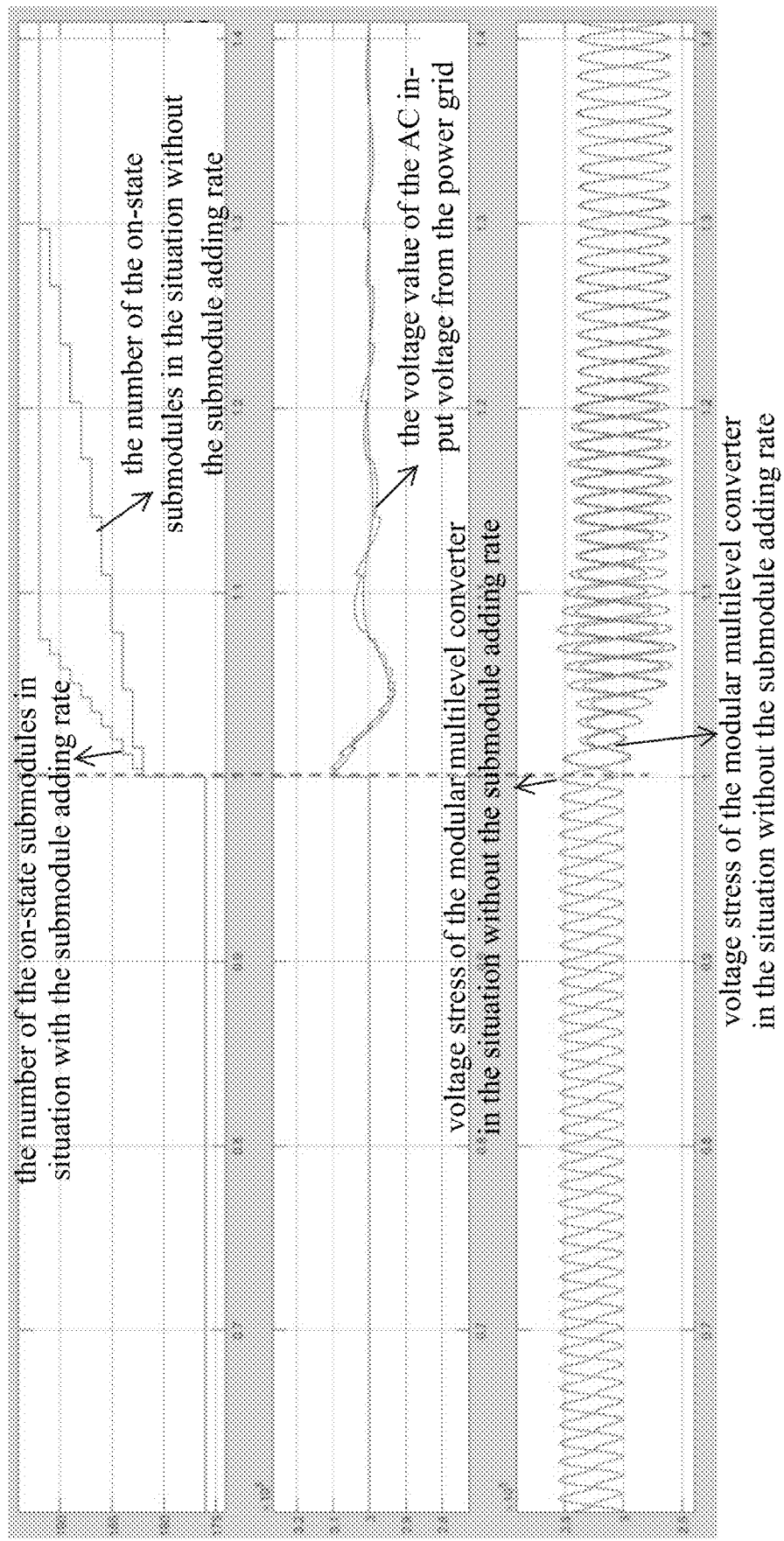
FIG. 5 schematically illustrates the simulation results of the control method for the modular multilevel converter according to the first embodiment of the present disclosure, in which the situation without the submodule adding rate and the situation with the submodule adding rate are compared.

FIG. 5 schematically illustrates the simulation results of the control method for the modular multilevel converter according to the first embodiment of the present disclosure, in which the situation without the submodule adding rate and the situation with the submodule adding rate are compared. It is assumed that the drop threshold value of the AC input voltage from the power grid 22 is 1V. In the upper plot of FIG. 5, the number of the on-state submodules in situation without the submodule adding rate and the number of the on-state submodules in the situation with the submodule adding rate are shown. In the middle plot of FIG. 5, the voltage value of the AC input voltage from the power grid 22 is shown. In the lower plot of FIG. 5, the voltage stress of the total submodule capacitor voltage of the modular multilevel converter 1 in the situation without the submodule adding rate and the voltage stress of the total submodule capacitor voltage of the modular multilevel converter 1 in the situation with the submodule adding rate are shown.

Please refer to the lower plot of FIG. 5 again. In case that the AC input voltage from the power grid 22 is lower than the drop threshold value, the voltage fluctuation of the modular multilevel converter 1 in the situation with the submodule adding rate is obviously lower than the voltage fluctuation of the modular multilevel converter 1 in the situation without the submodule adding rate. Due to the submodule adding rate, the voltage fluctuation of the modular multilevel converter 1 can be effectively suppressed.

Please refer to FIG. 3 again. After the step S5 is completed, the controller 4 determines whether the AC input voltage from the power grid 22 rises (Step S6). If the determining condition of the step S6 is satisfied, a step S7 is performed. In the step S7, under control of the controller 4, v idle upper bridge arm submodules 31 of the previously-added x idle upper bridge arm submodules 31 and v lower bridge arm submodules 32 of the previously-added x idle lower bridge arm submodules 32 are in the off-state in one or more times. That is, v idle upper bridge arm submodules 31 are switched from the on-state to the off-state and v lower bridge arm submodules 32 are switched from the on-state to the off-state by using a cutting method, wherein v x. The value v is determined according to an effective value of the rising AC input voltage from the power grid 22. When the AC input voltage rises from the drop threshold value to a normal voltage value, v=x. After the step S7 is completed, the step S1 is repeatedly done. If the determining condition of the step S6 is not satisfied, the controller 4 determines that the AC input voltage from the power grid 22 does not rise. Then, the step S1 is repeatedly done.

It is noted that numerous modifications and alterations may be made while retaining the teachings of the disclosure. For example, in a variant example of the step S7, the v idle upper bridge arm submodules 31 of the previously-added x idle upper bridge arm submodules 31 and the v lower bridge arm submodules 32 of the previously-added x idle lower bridge arm submodules 32 are in the off-state according to an initially cut submodule number. For example, in the step S7, b idle upper bridge arm submodules 31 of the v idle upper bridge arm submodules 31 and b idle lower bridge arm submodules 32 of the v idle lower bridge arm submodules 32 are defined as the initially-cut submodules, wherein b v. The value of the initially cut submodule number (i.e., b) is determined according to the rising extent of the AC input voltage from the power grid 22.

In another variant example of the step S7, the v idle upper bridge arm submodules 31 of the previously-added x idle upper bridge arm submodules 31 and the v lower bridge arm submodules 32 of the previously-added x idle lower bridge arm submodules 32 are in the off-state according to the initially cut submodule number, and the remaining (v−b) idle upper bridge arm submodules 31 of the previously-added x idle upper bridge arm submodules 31 and the remaining (v−b) idle lower bridge arm submodules 32 of the previously-added x idle lower bridge arm submodules 32 are in the off-state according to a submodule cutting rate. The submodule cutting rate denotes number of the cut idle bridge arm submodules per stage.

Figure 6:
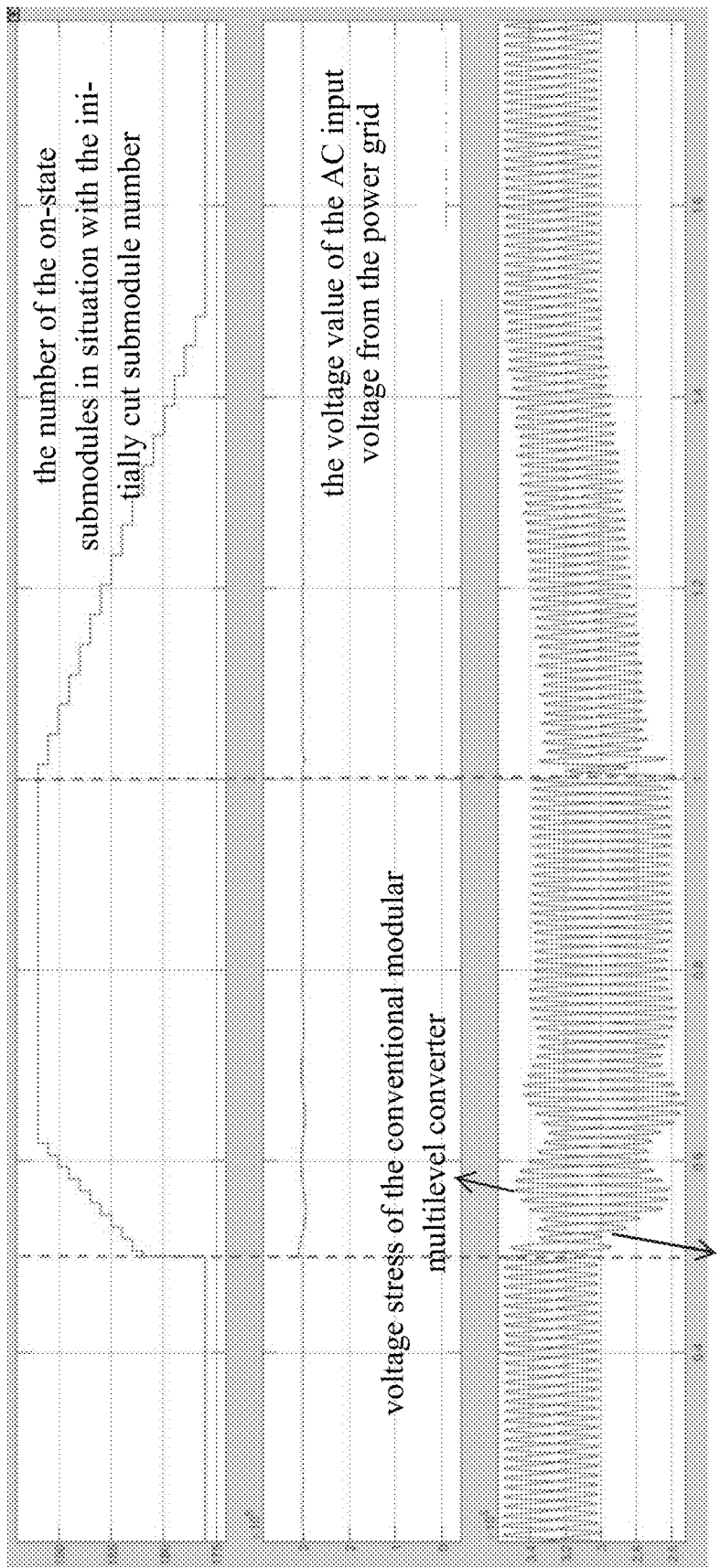
FIG. 6 schematically illustrates the simulation results of the control method for the modular multilevel converter according to the first embodiment of the present disclosure, in which the situation with initially cut submodule number and the result of the conventional modular multilevel converter are compared.

FIG. 6 schematically illustrates the simulation results of the control method for the modular multilevel converter according to the first embodiment of the present disclosure, in which the situation with initially cut submodule number and the result of the conventional modular multilevel converter are compared. It is assumed that the drop threshold value of the AC input voltage from the power grid 22 is 30% of the initial AC input voltage and the effective value of the AC input voltage is 1V. In the upper plot of FIG. 6, the number of the on-state submodules and the number of the off-state submodules in the situation with the initially cut submodule number are shown. In the middle plot of FIG. 6, the voltage value of the AC input voltage from the power grid 22 is shown. In the lower plot of FIG. 6, the voltage stress of the total submodule capacitor voltage of the modular multilevel converter 1 and the voltage stress of the total submodule capacitor voltage of the conventional modular multilevel converter are shown. In case that the AC input voltage from the power grid 22 is lower than the drop threshold value, the average voltage stress of the total submodule capacitor voltage of the modular multilevel converter 1 in the situation with the initially cut submodule number is lower than the average voltage stress of the total submodule capacitor voltage of the conventional modular multilevel converter. Due to the initially cut submodule number, the voltage stress of the total submodule capacitor voltage of the modular multilevel converter 1 can be effectively suppressed.

Figure 7A:
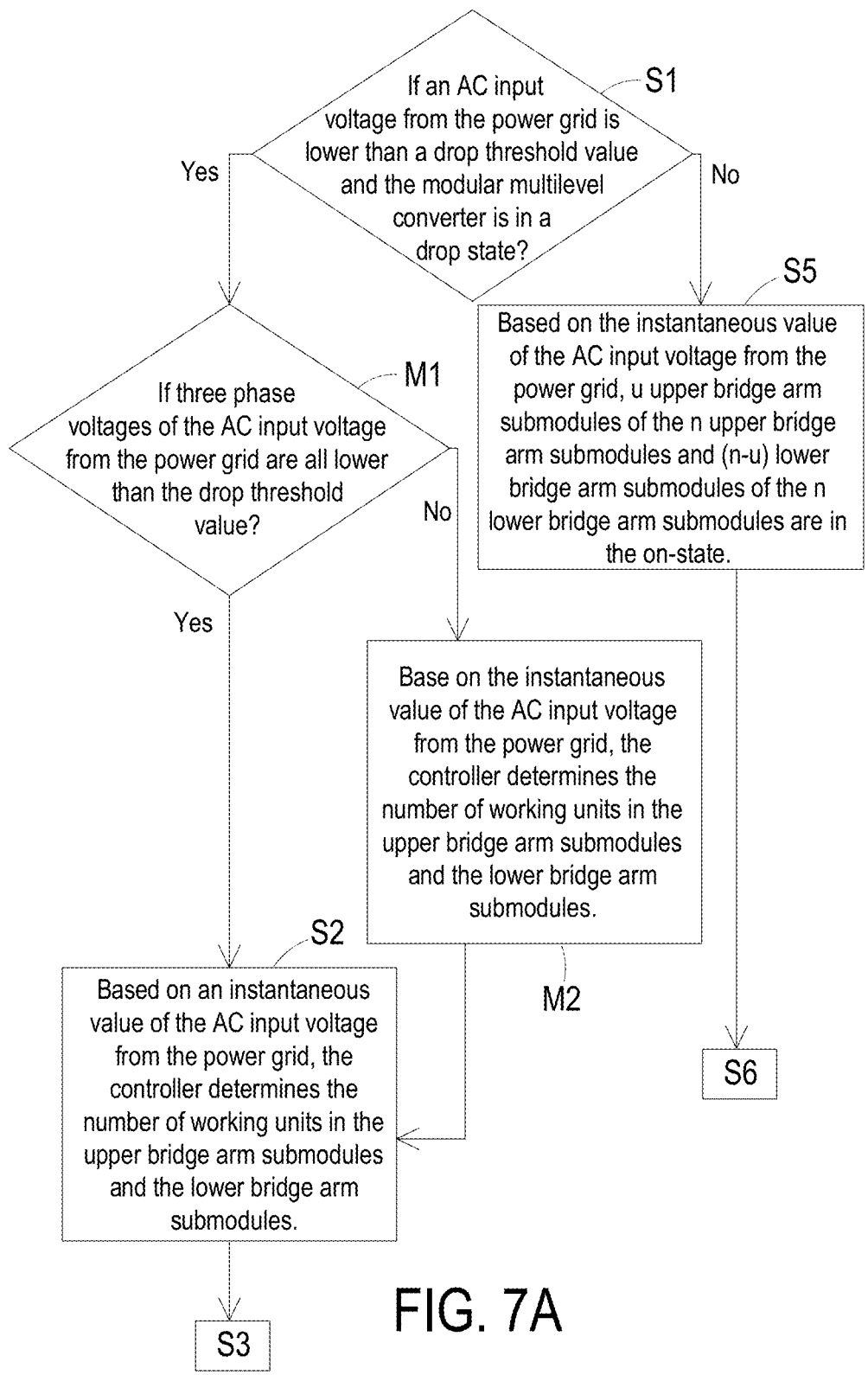
FIGS. 7A and 7B illustrate a flowchart of a control method for the modular multilevel converter according to a second embodiment of the present disclosure.
Figure 7B:
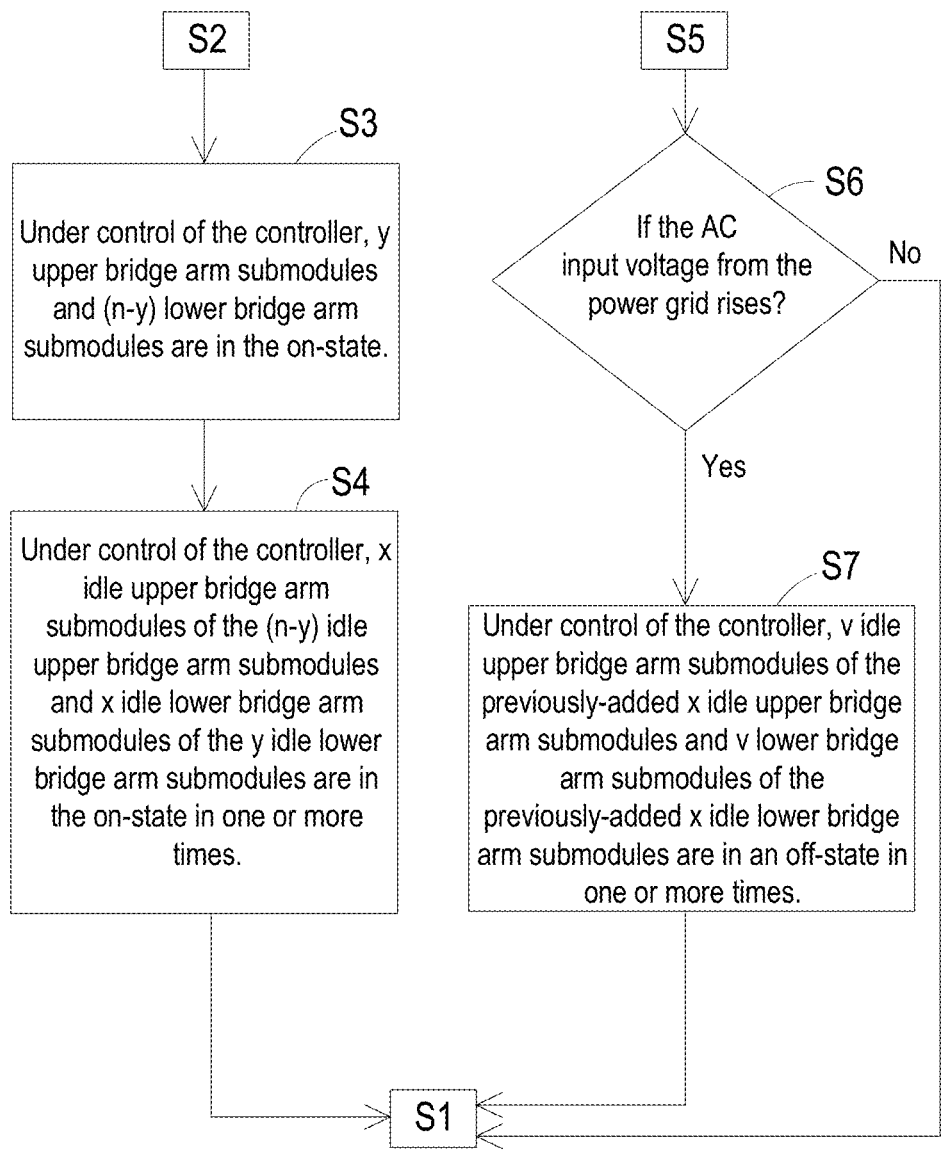

FIGS. 7A and 7B illustrate a flowchart of a control method for the modular multilevel converter according to a second embodiment of the present disclosure.

Firstly, in a step S1, the controller 4 determines whether an AC input voltage from the power grid 22 is lower than a drop threshold value.

If the determining condition of the step S1 is satisfied, it means that the modular multilevel converter 1 is in a drop state. Then, in a step M1, the controller 4 determines whether three phase voltages of the AC input voltage from the power grid 22 are all lower than the drop threshold value. If the determining condition of the step M1 is satisfied, it means that the modular multilevel converter 1 is in a symmetric drop state. Then, based on the instantaneous value of the AC input voltage from the power grid 22, the controller 4 determines the number of working units in the upper bridge arm submodules 31 and the lower bridge arm submodules 32 (Step S2). Then, under control of the controller 4, y upper bridge arm submodules 31 of the n upper bridge arm submodules 31 and (n−y) lower bridge arm submodules 32 of the n lower bridge arm submodules 32 are in the on-state (Step S3).

Then, under control of the controller 4, x idle upper bridge arm submodules 31 of the (n−y) idle upper bridge arm submodules 31 and x idle lower bridge arm submodules 32 of the y idle lower bridge arm submodules 32 are in the on-state in one or more times (Step S4).

In case that the instantaneous value of the AC input voltage is the positive peak value, at most m upper bridge arm submodules 31 of the n upper bridge arm submodules 31 are in the on-state, and at least (n−m) upper bridge arm submodules 31 of the n upper bridge arm submodules 31 are idle, wherein x≤(n−m). In case that the instantaneous value of the AC input voltage is the negative peak value, at most m lower bridge arm submodules 32 of the n lower bridge arm submodules 32 are in the on-state, and at least (n−m) lower bridge arm submodules 32 of the n lower bridge arm submodules 32 are idle, wherein x≤(n−m).

After the step S4 is completed, the step S1 is repeatedly done.

If the determining condition of the step M1 is not satisfied, it means that at least one phase voltage of the three phase voltages of the AC input voltage from the power grid 22 is not lower than the drop threshold value. Under this circumstance, the modular multilevel converter 1 is in an asymmetric drop state (e.g., a single-phase drop state or a two-phase drop state). Then, in a step M2, the input power of the power grid 22 is decreased according to the degree of unbalance of the power grid 22. If the degree of unbalance of the power grid 22 is increased, the input power of the power grid 22 is decreased under control of the controller 4. The degree of unbalance of the power grid 22 denotes the degree of unbalance of the three phase voltages of the AC input voltage from the power grid 22. After the step M2 is completed, the step S2 is performed.

If the determining condition of the step S1 is not satisfied, it means that the modular multilevel converter 1 is in a normal working state. Then, in a step S5, u upper bridge arm submodules 31 of the n upper bridge arm submodules 31 and (n−u) lower bridge arm submodules 32 of the n lower bridge arm submodules 32 are in the on-state based on the instantaneous value of the AC input voltage from the power grid 22, wherein the value u is determined according to the instantaneous value of the AC input voltage.

After the step S5 is completed, the controller 4 determines whether the AC input voltage from the power grid 22 rises (Step S6). If the determining condition of the step S6 is satisfied, a step S7 is performed. In the step S7, under control of the controller 4, v idle upper bridge arm submodules 31 of the previously-added x idle upper bridge arm submodules 31 and v lower bridge arm submodules 32 of the previously-added x idle lower bridge arm submodules 32 are in the off-state in one or more times. That is, v idle upper bridge arm submodules 31 are switched from the on-state to the off-state and v lower bridge arm submodules 32 are switched from the on-state to the off-state by using a cutting method, wherein v x. The value v is determined according to an effective value of the rising AC input voltage from the power grid 22. When the AC input voltage rises from the drop threshold value to a normal voltage value, v=x. After the step S7 is completed, the step S1 is repeatedly done. If the determining condition of the step S6 is not satisfied, the controller 4 determines that the AC input voltage from the power grid 22 does not rise. Then, the step S1 is repeatedly done.

Figure 8A:
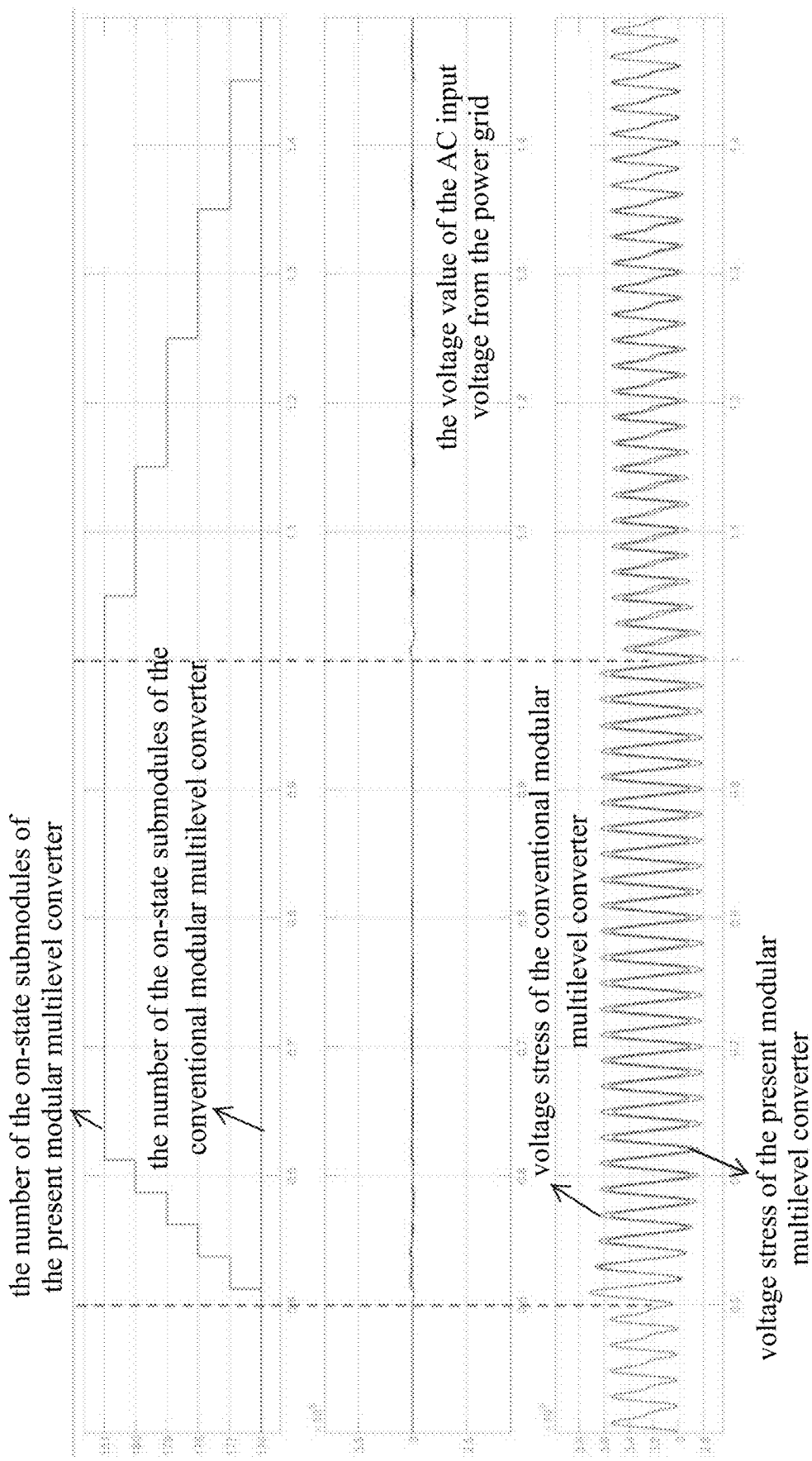
FIGS. 8A and 8B schematically illustrate the simulation results of the control method for the modular multilevel converter according to the second embodiment of the present disclosure and the simulation results of the conventional modular multilevel converter, in which the AC input voltage from the power grid is in a symmetric drop state.
Figure 8B:
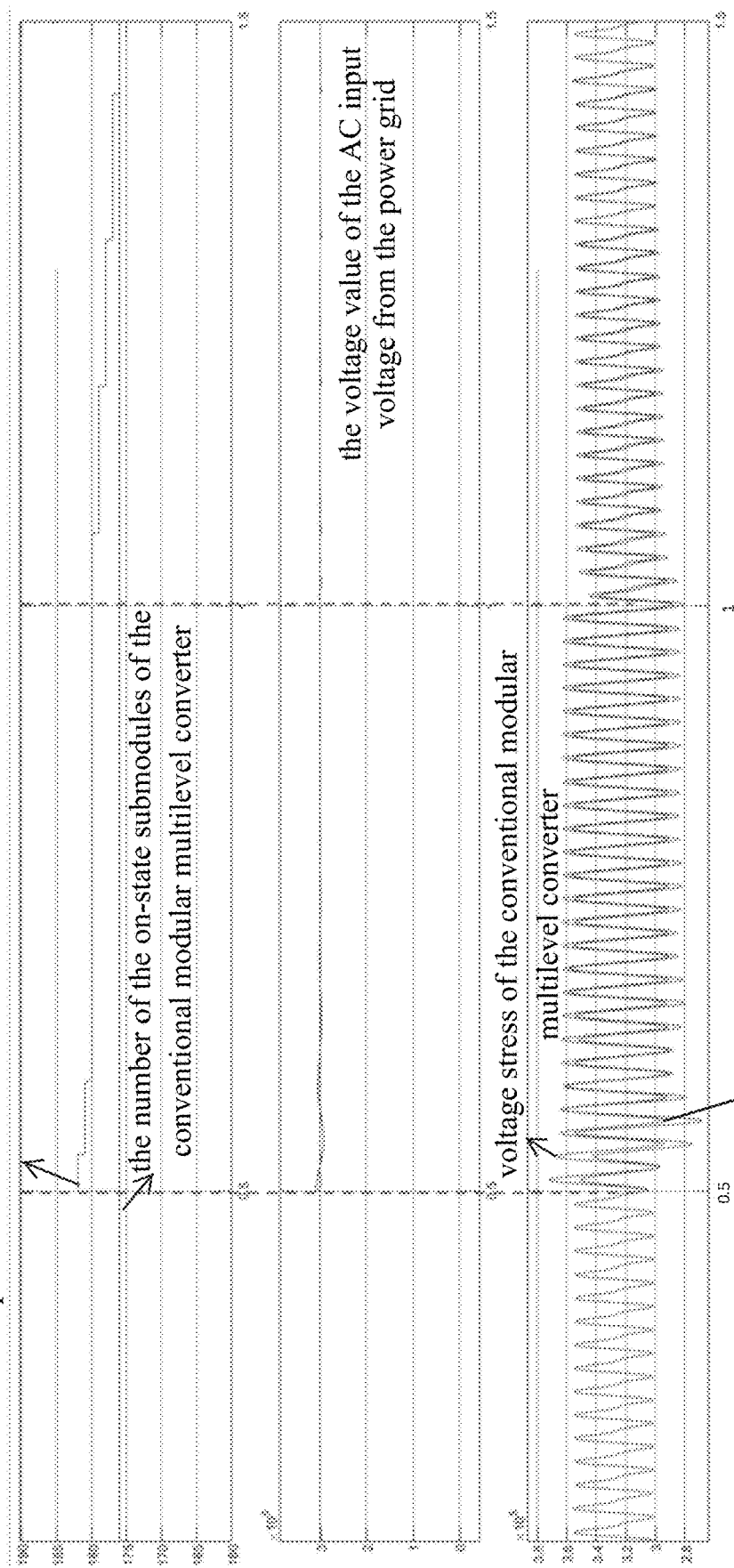
Figure 8C:
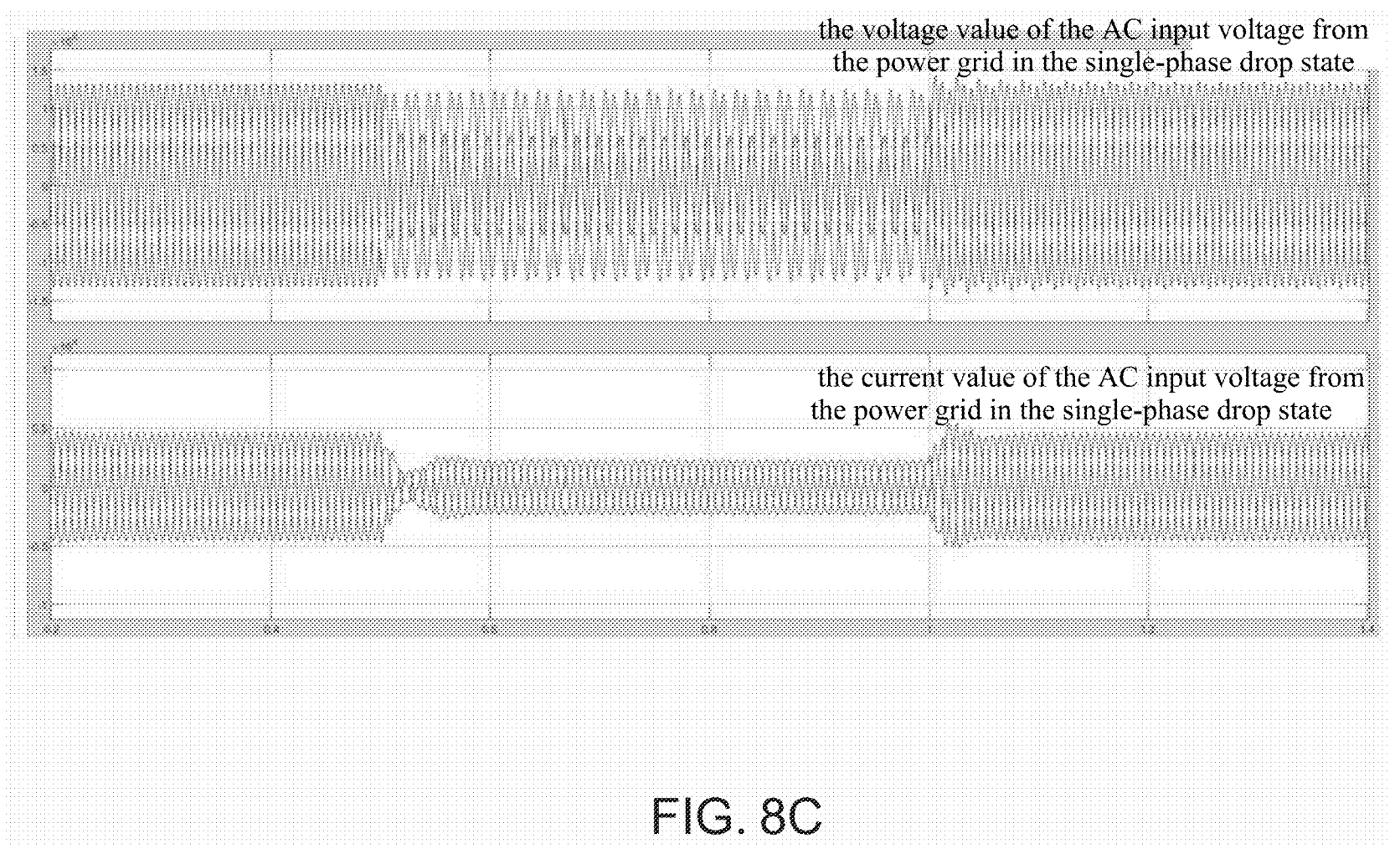
Figure 8D:
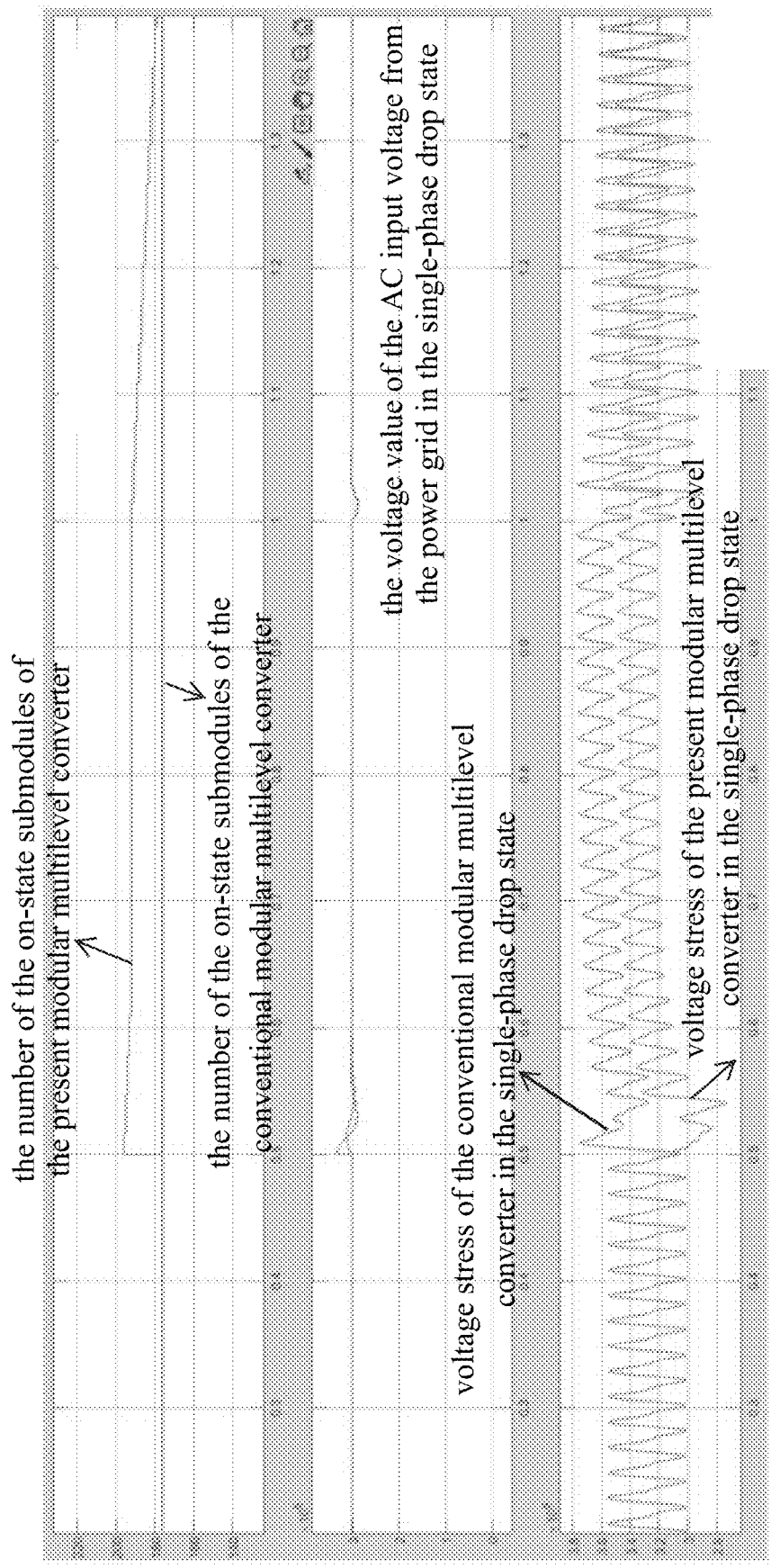
Figure 8E:
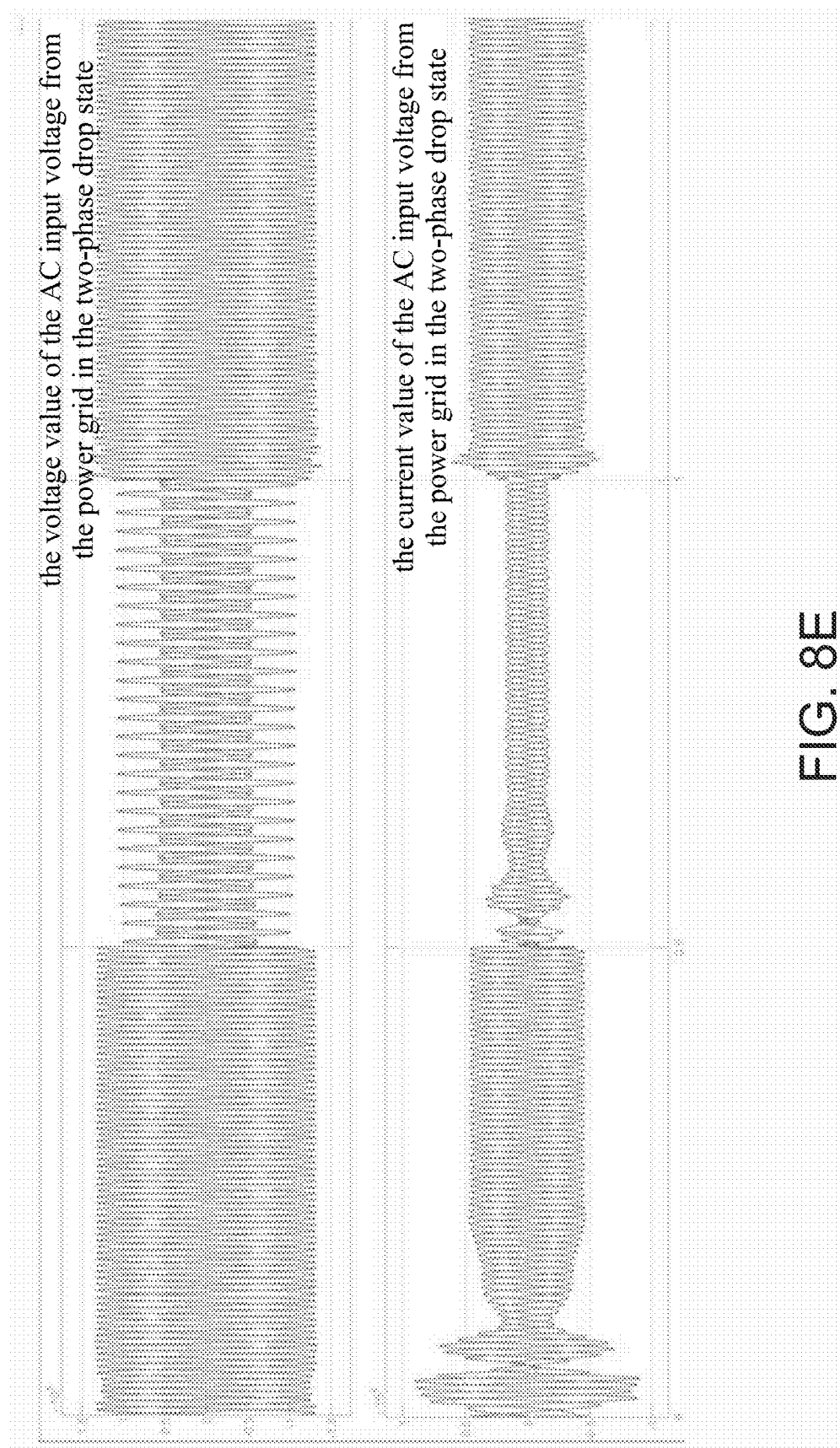
FIGS. 8E and 8F schematically illustrate the simulation results of the control method for the modular multilevel converter according to the second embodiment of the present disclosure and the simulation results of the conventional modular multilevel converter, in which the AC input voltage from the power grid is in a two-phase drop state.
Figure 8F:
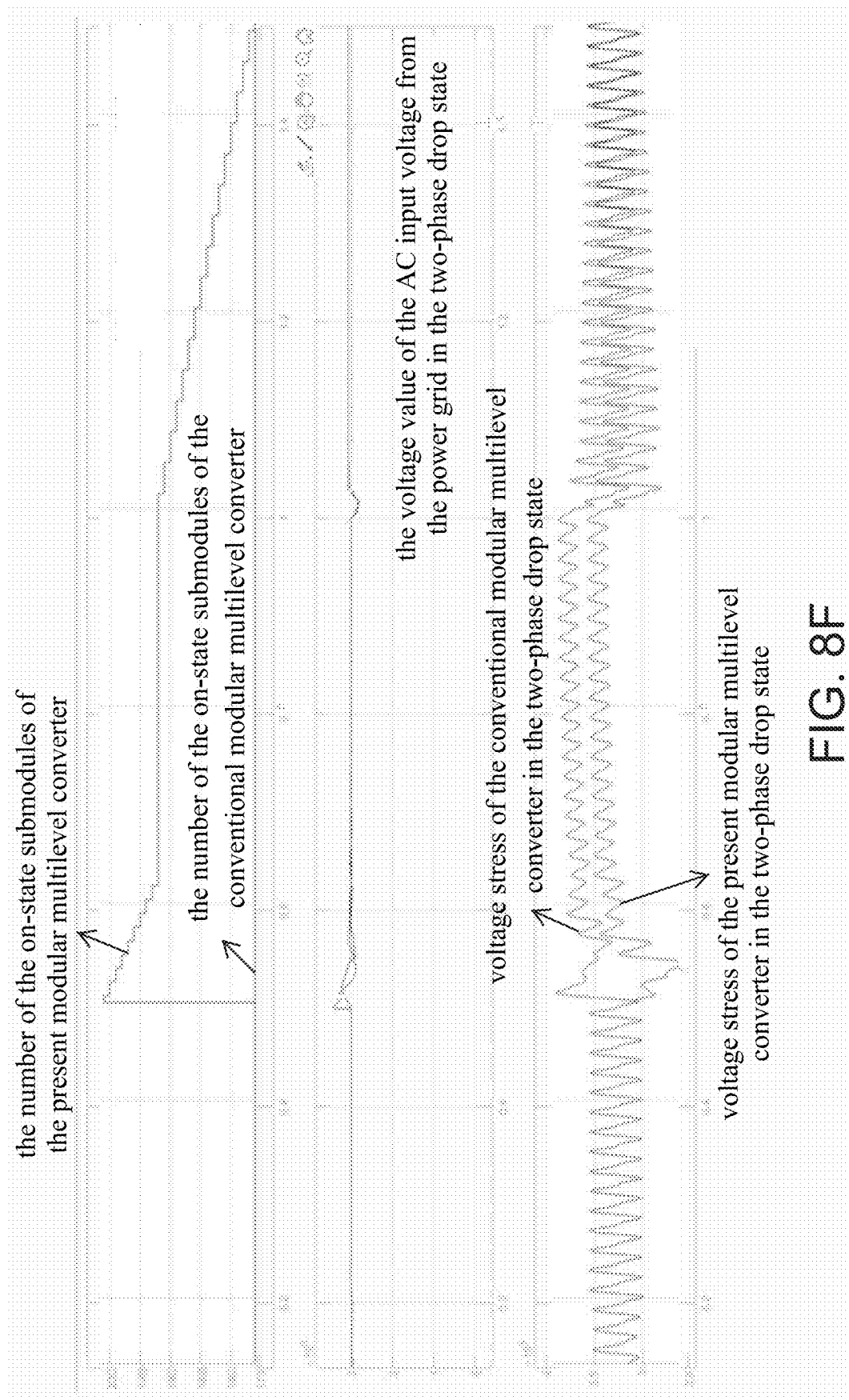

FIGS. 8A and 8B schematically illustrate the simulation results of the control method for the modular multilevel converter according to the second embodiment of the present disclosure and the simulation results of the conventional modular multilevel converter, in which the AC input voltage from the power grid is in a symmetric drop state. FIGS. 8C and 8D schematically illustrate the simulation results of the control method for the modular multilevel converter according to the second embodiment of the present disclosure and the simulation results of the conventional modular multilevel converter, in which the AC input voltage from the power grid is in a single-phase drop state. FIGS. 8E and 8F schematically illustrate the simulation results of the control method for the modular multilevel converter according to the second embodiment of the present disclosure and the simulation results of the conventional modular multilevel converter, in which the AC input voltage from the power grid is in a two-phase drop state. It is assumed that the drop threshold value of the AC input voltage from the power grid 22 is 0.5V.

Please refer to FIGS. 8A and 8B. In case that the AC input voltage from the power grid 22 is lower than the drop threshold value and the AC input voltage from the power grid is in the symmetric drop state, the average voltage stress of the total submodule capacitor voltage of the modular multilevel converter 1 is lower than the average voltage stress of the total submodule capacitor voltage of the conventional modular multilevel converter, and the voltage fluctuation of the modular multilevel converter 1 is obviously lower than the voltage fluctuation of the conventional modular multilevel converter. In other words, when the AC input voltage from the power grid is in the symmetric drop state, the average voltage stress and the voltage fluctuation of the modular multilevel converter of the present disclosure can be effectively reduced.

Please refer to FIGS. 8C, 8D, 8E and 8F. In case that the AC input voltage from the power grid 22 is lower than the drop threshold value and the AC input voltage from the power grid is in the single-phase drop state or the two-phase drop state, the average voltage stress of the total submodule capacitor voltage of the modular multilevel converter 1 is lower than the average voltage stress of the total submodule capacitor voltage of the conventional modular multilevel converter.

Regardless of whether the power corresponding to the AC input voltage from the power grid 22 is an active power or a reactive power, the modular multilevel converter 1 can enhance the efficacy of suppressing the average voltage stress of the total submodule capacitor voltage.

From the above descriptions, the present disclosure provides the modular multilevel converter and the control method for the modular multilevel converter. In case that the modular multilevel converter is in the drop state, the idle upper bridge arm submodules of the n upper bridge arm submodules and the idle lower bridge arm submodules of the n lower bridge arm submodules are in the on-state. Consequently, the total number of the on-state upper bridge arm submodules and the on-state lower bridge arm submodules is increased to be greater than n. Since the average value of the DC voltages received by the upper bridge arm submodules or the lower bridge arm submodules is decreased, the voltage stress of the total submodule capacitor voltage of the on-state upper bridge arm submodules and the on-state lower bridge arm submodules is reduced. In accordance with the present disclosure, the modular multilevel converter and the control method can meet the low-voltage ride-through requirements in a cost-effective and high-reliable manner. Furthermore, the modular multilevel converter and the control method of the present disclosure can achieve the function of suppressing the voltage fluctuations. Consequently, the safety of using the modular multilevel converter and the control method of the present disclosure will be enhanced. Furthermore, the efficacy of suppressing the average voltage stress of the total submodule capacitor voltage is enhanced according to the initially added submodule number, the submodule adding rate, the initially cut submodule number or the submodule cutting rate.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a modular multilevel converter, the modular multilevel converter comprising a bridge arm and a controller, the bridge arm comprising n upper bridge arm submodules and n lower bridge arm submodules, the modular multilevel converter being electrically connected with a voltage bus, a midpoint of the voltage bus being electrically connected with a power grid, the modular multilevel converter receiving an AC input voltage from the power grid, the AC input voltage having a positive peak value and a negative peak value relative to the midpoint of the voltage bus, the controller being coupled with the n upper bridge arm submodules and n lower bridge arm submodules, the control method comprising steps of:

when the AC input voltage from the power grid is lower than a drop threshold value and the modular multilevel converter is in a drop state, the controller determining the number of working units in the n upper bridge arm submodules and the n lower bridge arm submodules based on the instantaneous value of the AC input voltage;

controlling y upper bridge arm submodules of the n upper bridge arm submodules and (n−y) lower bridge arm submodules of the n lower bridge arm submodules to be in an on-state, so that (n−y) of the n upper bridge arm submodules are idle upper bridge arm submodules and y of the n lower bridge arm submodules are idle lower bridge arm submodules; and in one or more times, controlling x idle upper bridge arm submodules of the (n−y) idle upper bridge arm submodules and x idle lower bridge arm submodules of the y idle lower bridge arm submodules to be in the on-state, wherein when the instantaneous value of the AC input voltage is the positive peak value, at most m upper bridge arm submodules of the n upper bridge arm submodules are in the on-state, and at least (n−m) upper bridge arm submodules of the n upper bridge arm submodules are idle, wherein when the instantaneous value of the AC input voltage is the negative peak value, at most m lower bridge arm submodules of the n lower bridge arm submodules are in the on-state, and at least (n−m) lower bridge arm submodules of the n lower bridge arm submodules are idle, wherein x≤(n−m).

2. The control method according to claim 1, wherein when the AC input voltage from the power grid is lower than the drop threshold value and the modular multilevel converter is in the drop state, a total number of the on-state upper bridge arm submodules and the on-state lower bridge arm submodules is greater than n.

3. The control method according to claim 1, wherein the step of controlling x idle upper bridge arm submodules and x idle lower bridge arm submodules to be in the on-state in one or more times comprising sub-steps of:

defining d idle upper bridge arm submodules of the x idle upper bridge arm submodules and d idle lower bridge arm submodules of the x idle lower bridge arm submodules as the initially-added submodules, wherein d is an initially added submodule number, and d≤x; and allowing remaining (x−d) idle upper bridge arm submodules of the x idle upper bridge arm submodules and remaining (x−d) idle lower bridge arm submodules of the x idle lower bridge arm submodules to be in the on-state according to a submodule adding rate.

4. The control method according to claim 3, wherein when the modular multilevel converter is in the drop state, the control method further comprises a step of comparing three phase voltages of the AC input voltage with the drop threshold value, wherein when the three phase voltages of the AC input voltage are all lower than the drop threshold value, the modular multilevel converter is in a symmetric drop state, wherein at least one of the three phase voltages of the AC input voltage from the power grid is not lower than the drop threshold value, the modular multilevel converter is in an asymmetric drop state, wherein when the modular multilevel converter is in the asymmetric drop state, the control method further comprises a step of decreasing an input power of the power grid according to an unbalance degree the power grid before the step of controlling x idle upper bridge arm submodules and x idle lower bridge arm submodules to be in the on-state in one or more times, wherein the input power of the power grid is decreased with the increasing unbalance degree of the power grid.

5. The control method according to claim 3, wherein the initially added submodule number d is determined according to the drop threshold value of the AC input voltage from the power grid.

6. The control method according to claim 1, wherein when the AC input voltage from the power grid is not lower than the drop threshold value and the AC input voltage rises, the control method further comprises a step of allowing v idle upper bridge arm submodules of the previously-added x idle upper bridge arm submodules and v lower bridge arm submodules of the previously-added x idle lower bridge arm submodules to be in an off-state in one or more times, wherein v≤x, wherein v is determined according to an effective value of the AC input voltage from the power grid after the AC input voltage rises, wherein when the AC input voltage rises from the drop threshold value to a normal voltage value, v=x.

7. The control method according to claim 6, wherein the steps of allowing the v idle upper bridge arm submodules of the previously-added x idle upper bridge arm submodules and the v lower bridge arm submodules of the previously-added x idle lower bridge arm submodules to be in the off-state in one or more times comprises sub-steps of:

defining b idle upper bridge arm submodules of the v idle upper bridge arm submodules and b idle lower bridge arm submodules of the v idle lower bridge arm submodules as the initially-cut submodules, wherein b is an initially cut submodule number, and b≤v; and allowing remaining (v−b) idle upper bridge arm submodules of the v idle upper bridge arm submodules and remaining (v−b) idle lower bridge arm submodules of the b idle lower bridge arm submodules to be in the off-state according to a submodule cutting rate.

8. The control method according to claim 7, wherein the initially cut submodule number b is determined according to a rising extent of the AC input voltage.

9. The control method according to claim 1, wherein when the AC input voltage from the power grid is not lower than the drop threshold value, u upper bridge arm submodules of the n upper bridge arm submodules and (n−u) lower bridge arm submodules of the n lower bridge arm submodules are in the on-state, wherein u is determined according to the instantaneous value of the AC input voltage, wherein when the instantaneous value of the AC input voltage is the positive peak value, u is 0, wherein when the instantaneous value of the AC input voltage is the negative peak value, u is n.

10. A modular multilevel converter being electrically connected with a voltage bus, a midpoint of the voltage bus being electrically connected with a power grid, the modular multilevel converter receiving an AC input voltage from the power grid, the modular multilevel converter comprising:

a bridge arm connected with the voltage bus to receive the AC input voltage, wherein the bridge arm comprises n upper bridge arm submodules and n lower bridge arm submodules, and the AC input voltage has a positive peak value and a negative peak value relative to the midpoint of the voltage bus; and a controller being coupled with the n upper bridge arm submodules and n lower bridge arm submodules, wherein the controller performs a control method comprising steps of:

when the AC input voltage from the power grid is lower than a drop threshold value and the modular multilevel converter is in a drop state, the controller determining the number of working units in the n upper bridge arm submodules and the n lower bridge arm submodules based on the instantaneous value of the AC input voltage;

controlling y upper bridge arm submodules of the n upper bridge arm submodules and (n–y) lower bridge arm submodules of the n lower bridge arm submodules to be in an on-state, so that (n–y) of the n upper bridge arm submodules are idle upper bridge arm submodules and y of the n lower bridge arm submodules are idle lower bridge atm submodules; and in one or more times, controlling x idle upper bridge arm submodules of the (n–y) idle upper bridge arm submodules and x idle lower bridge arm submodules of the y idle lower bridge arm submodules to be in the on-state, wherein when the instantaneous value of the AC input voltage is the positive peak value, at most m upper bridge arm submodules of the n upper bridge arm submodules are in the on-state, and at least (n–m) upper bridge arm submodules of the n upper bridge arm submodules are idle, wherein when the instantaneous value of the AC input voltage is the negative peak value, at most m lower bridge arm submodules of the n lower bridge arm submodules are in the on-state, and at least (n–m) lower bridge arm submodules of the n lower bridge arm submodules are idle, wherein $x \leq (n-m)$.

* * * * *